US009567079B2

(12) United States Patent
Johnson et al.

(10) Patent No.: US 9,567,079 B2
(45) Date of Patent: Feb. 14, 2017

(54) VTOL SYMMETRIC AIRFOIL FUSELAGE OF FIXED WING DESIGN

(71) Applicants: Jonathon Thomas Johnson, Morrow, GA (US); Elizabeth V. M. Johnson, Fayetteville, GA (US)

(72) Inventors: Jonathon Thomas Johnson, Morrow, GA (US); Elizabeth V. M. Johnson, Fayetteville, GA (US)

( * ) Notice: Subject to any disclaimer, the term of this patent is extended or adjusted under 35 U.S.C. 154(b) by 25 days.

(21) Appl. No.: 14/849,814

(22) Filed: Sep. 10, 2015

(65) Prior Publication Data

US 2016/0096613 A1   Apr. 7, 2016

Related U.S. Application Data

(60) Provisional application No. 62/048,369, filed on Sep. 10, 2014.

(51) Int. Cl.
*B64C 39/02* (2006.01)
*B64C 25/32* (2006.01)
*B64C 29/04* (2006.01)

(52) U.S. Cl.
CPC ............ *B64C 39/024* (2013.01); *B64C 25/32* (2013.01); *B64C 29/04* (2013.01); *B64C 2025/325* (2013.01); *B64C 2201/021* (2013.01); *B64C 2201/048* (2013.01); *B64C 2201/088* (2013.01); *B64C 2201/104* (2013.01); *B64C 2201/16* (2013.01); *B64C 2201/18* (2013.01)

(58) Field of Classification Search
CPC ......... B64C 39/024; B64C 25/32; B64C 29/04

USPC ....... 244/17.11, 6, 7 R, 7 B, 7 A, 12.1–12.5, 244/17.23, 17.25
See application file for complete search history.

(56) References Cited

U.S. PATENT DOCUMENTS

| | | | | | |
|---|---|---|---|---|---|
| 2,622,826 | A | * | 12/1952 | Prince | B64C 29/02 244/17.21 |
| 3,116,040 | A | * | 12/1963 | Petrides | B64C 27/18 244/17.13 |
| 3,259,343 | A | * | 7/1966 | Roppel | B64C 29/0075 244/12.4 |
| 3,350,035 | A | * | 10/1967 | Schlieben | B64C 29/02 244/34 R |
| 5,289,994 | A | * | 3/1994 | Del Campo Aguilera | B64C 27/22 244/12.1 |
| 5,765,783 | A | * | 6/1998 | Albion | B64C 29/02 244/17.23 |
| 6,561,455 | B2 | * | 5/2003 | Capanna | B64C 29/02 244/7 A |
| 8,146,854 | B2 | * | 4/2012 | Lawrence | B64C 39/024 244/17.23 |
| 8,505,846 | B1 | * | 8/2013 | Sanders, II | B64C 11/003 244/7 A |
| 8,991,751 | B2 | * | 3/2015 | Page | B64C 29/02 244/39 |
| 9,254,916 | B2 | * | 2/2016 | Yang | B64C 3/546 |
| 9,481,457 | B2 | * | 11/2016 | Alber | B64C 39/024 |

(Continued)

*Primary Examiner* — Justin Benedik
(74) *Attorney, Agent, or Firm* — Merek, Blackmon & Voorhees, LLC

(57) ABSTRACT

Current aircraft technology comprises of fixed wing, multi rotor and vectored engine design. The synthesis of fixed wing technology and vectoring engine technology has been implemented but limited to traditional fixed wing design aircraft. The aircraft presented has been designed with an innovation in airframe expectation, improved vectoring engine design system, and landing gear system.

12 Claims, 4 Drawing Sheets

(56) References Cited

U.S. PATENT DOCUMENTS

| | | | |
|---|---|---|---|
| 2005/0051667 A1* | 3/2005 | Arlton | B64C 27/10 244/17.11 |
| 2014/0008498 A1* | 1/2014 | Reiter | B64C 29/02 244/7 A |
| 2015/0232178 A1* | 8/2015 | Reiter | B64C 29/0033 244/7 A |

* cited by examiner

VTOL SYMMETRIC AIRFOIL FUSELAGE OF FIXED WING DESIGN

CROSS REFERENCE TO RELATED APPLICATIONS

This application claims the benefit of U.S. Provisional Application 62/048,369, filed Sep. 10, 2014, entitled "VTOL SYMMETRIC AIRFOIL FUSELAGE OF FIXED WING DESIGN," which is incorporated herein by reference.

BACKGROUND OF THE INVENTION

This invention relates generally to the enhancement of aircraft design, primarily in the unmanned aircraft vehicle (UAV) domain. UAV design recently has taken several forms and appearances with corresponding applications and implementations.

Fixed wing UAV aircraft are primarily built around a ground parallel fuselage traversing the length of the aircraft implementing fixed or blended parallel surfaces with respect to the aircraft in order to provide a perpendicular force or lift. The aircraft is then provided forward thrust by a propulsive device using compressor/turbine power, propeller power, or a combination/hybrid of each.

Traditional fixed wing UAV aircraft are controlled in flight using a series of moving surfaces denoted as the aileron, elevator, and rudder, each attached to different locations of the aircraft. The aileron is attached to the primary lifting surface, elevators attached to the secondary lifting surface, and rudder attached to the vertical tail. Some blended wing UAV aircraft such as the Lockheed martin rq-170 sentinel drone implement split flaps inducing surface specific drag rather than a vertical tail. Fixed wing UAV aircraft provide efficient, multi-range, reliable methods of surveillance and military designated missions.

Rotorcraft UAV aircraft are primarily built around a series of rotating blades compromised in a single rotor hub or multi rotor hub system. Single rotor hub aircraft synthesize the lifting and thrust components into a single source and its vector controlled by a swash plate and series of bar linkages to determine the orientation of the aircraft. Additionally pitch angle of the blades can be controlled in order to determine the magnitude of the lifting and thrust vector. The angular momentum of the primary blade is then offset by a counter rotating secondary tail blade and connected through a gearbox and/or transmission system to the primary blade. The yaw orientation of the aircraft is controlled by the pitch angle of the secondary counter-rotating blade.

Multi rotor hub UAV aircraft such as a quad-copter or octo-copter at current time maintain a constant blade pitch angle and employ differential angular velocities per rotor hub in order to maneuver roll, pitch, and yaw orientation the aircraft. Vertical motion is controlled simply by available power to each rotor hub. The primary benefit of rotorcraft-implemented device is the vertical take off and landing (VTOL) aspect. The primary adverse effect of large rotor-craft vehicles is overcoming transonic blade tip speeds, which limits forward flight speeds.

Hybrid UAV aircraft synthesize both a primary lifting winged surface and a variable vector thrust in order to achieve VTOL and efficient cruise performance. The design and appearance of these vehicles is extensive and conceptual domain endless. Most designs however incorporate a tilt rotor feature employing either single or dual ducted/unducted fans, which are either covered or exposed during, forward flight.

The application for such UAV aircraft designs is under constant exploration and optimization. Current applications for UAV aircraft are military designated reconnaissance, government, industrial/geological surveillance, and hobby enthusiasts. Applications under consideration and future applications may include but are not limited to courier shipping, agriculture surveillance, and medical transport. Currently the FAA is set to rule on regulations and limitations of domestic UAV employment and should be stated within the end of 2014.

SUMMARY OF THE INVENTION

The invention concerns a UAV aircraft and the associated assemblies that define it as original and novel. The UAV includes a symmetric airfoil airframe, dual vertically positioned vectoring nozzles, an arthropod landing gear assembly, and left/right cargo bay doors for the location of onboard cargo. The aircraft retracts the landing gear through a collapsing telescopic technique and single rotation of the assembly into the airframe. An internal engine system, either comprising of electric or gas power accelerates air through the nozzles for vertical take off. Forward motion is attained through the rotation of the nozzles rearward.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

Figure 1:
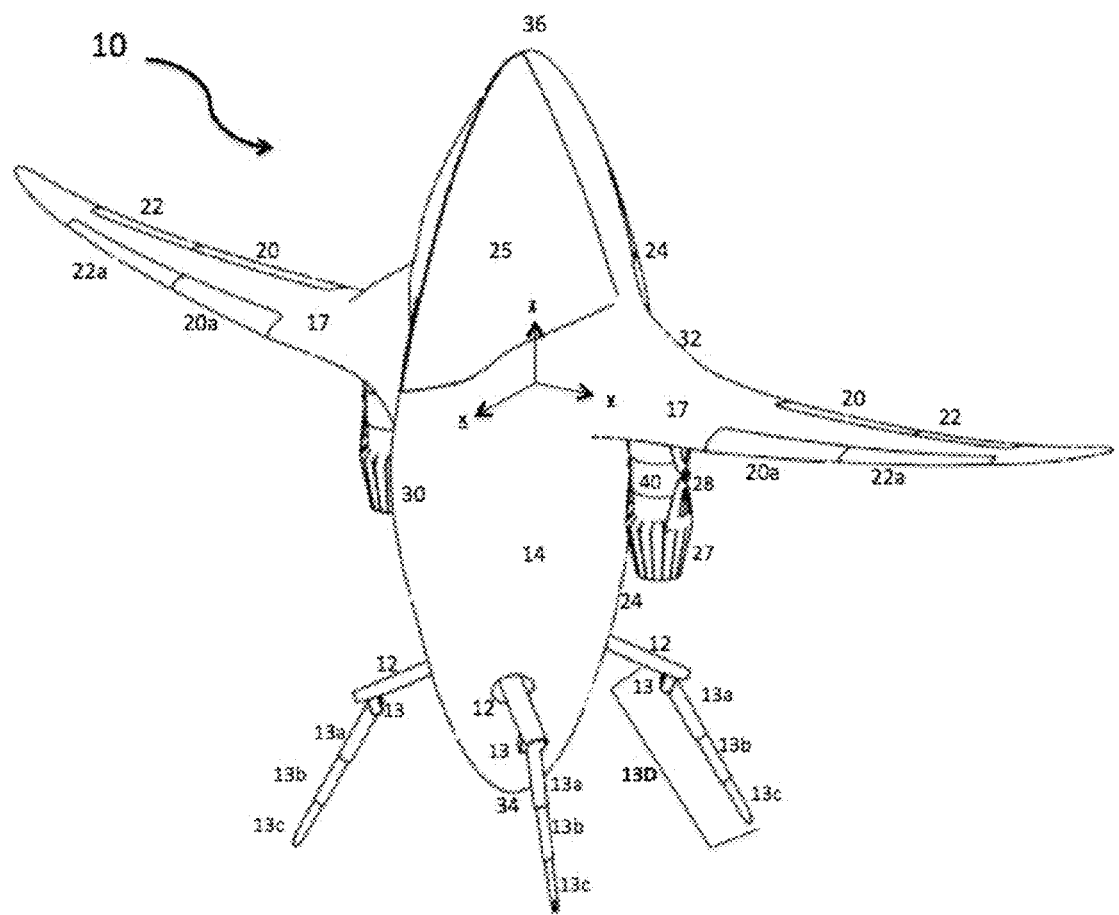
FIG. 1 is a wire frame schematic isometric diagram of a UAV aircraft with a symmetric airfoil fuselage perpendicular to the ground, vertically mounted and variable vector engine nozzle assemblies, arthropod landing gear assemblies, and cargo bay door assembly. It additionally displays the location of the control surfaces

FIG. 1 is a schematic isometric diagram of an UAV aircraft 10 consisting of a symmetric airfoil fuselage 14 orientated along the Z-axis, wings 17 moderately parallel to the ground along Y-axis, and vertically oriented nozzles 27 aligned with Z-axis.

In the particular configuration of FIG. 1, aircraft 10 is of fixed wing design. The fixed wing design term is used due to fixed lifting surface configured perpendicular to the fuselage 14. This is not to say however that the wings 17 in a variant design may be allowed to rotate with respect to the X-axis during VTOL to forward flight maneuver. However, as used in this application and claims, unless explicitly stated otherwise, "fixed wing(s)" or "fixed lifting surface(s)" shall refer to aerodynamically designed surfaces that are rigidly, non-rotatingly and permanently attached to the fuselage. The fuselage 14 extends from beginning point 30 to a terminal 32 along the X-axis, and beginning point 34 to terminal point 36 along the Z-Axis. Lengths 34-36, and 30-32 are the defining boundary points for the fuselage. Points are denoted to describe the boundary of the aircraft rather than nose or tail due to the symmetry of the aircraft, and to prevent any confusion in discussion. The wings 17 are substantially parallel with the ground and fixed to the fuselage 14 between points 30 and 32. Consistent with these definitions substantially parallel includes angles of five to seven degrees (5 - 7). Additionally portions of fuselage 14 are composed of struts, membranes, and material lattice sections. Cargo bay doors 25 are located above the wings 17 in the quadrant of points 30 and 36.

An internal engine propulsion system comprising of hydrocarbon, electrical power, or "future power source" generation accelerates air out of nozzle 27. The term "future power source" generation is stated in the event that an emerging energy technology is provided. This power generation could be of hydrogen fuel cell, ferrofluid, or atomic type. The internal engine propulsion system is located within fuselage 14. VTOL capability is employed through nozzle 27 oriented along Z-axis and perpendicular to the ground. Consistent with these definitions substantially perpendicular includes angles of eighty to ninety degrees (80-90). Forward motion in the direction of the positive X-axis is provided by use of a rotational elbow assembly 28, see FIG. 5, which rotates about the Y-axis. Rotational ring ducting assembly 40, through the implementation of rotational rings provides passage for compressed air out engine propulsion system.

Figure 2:
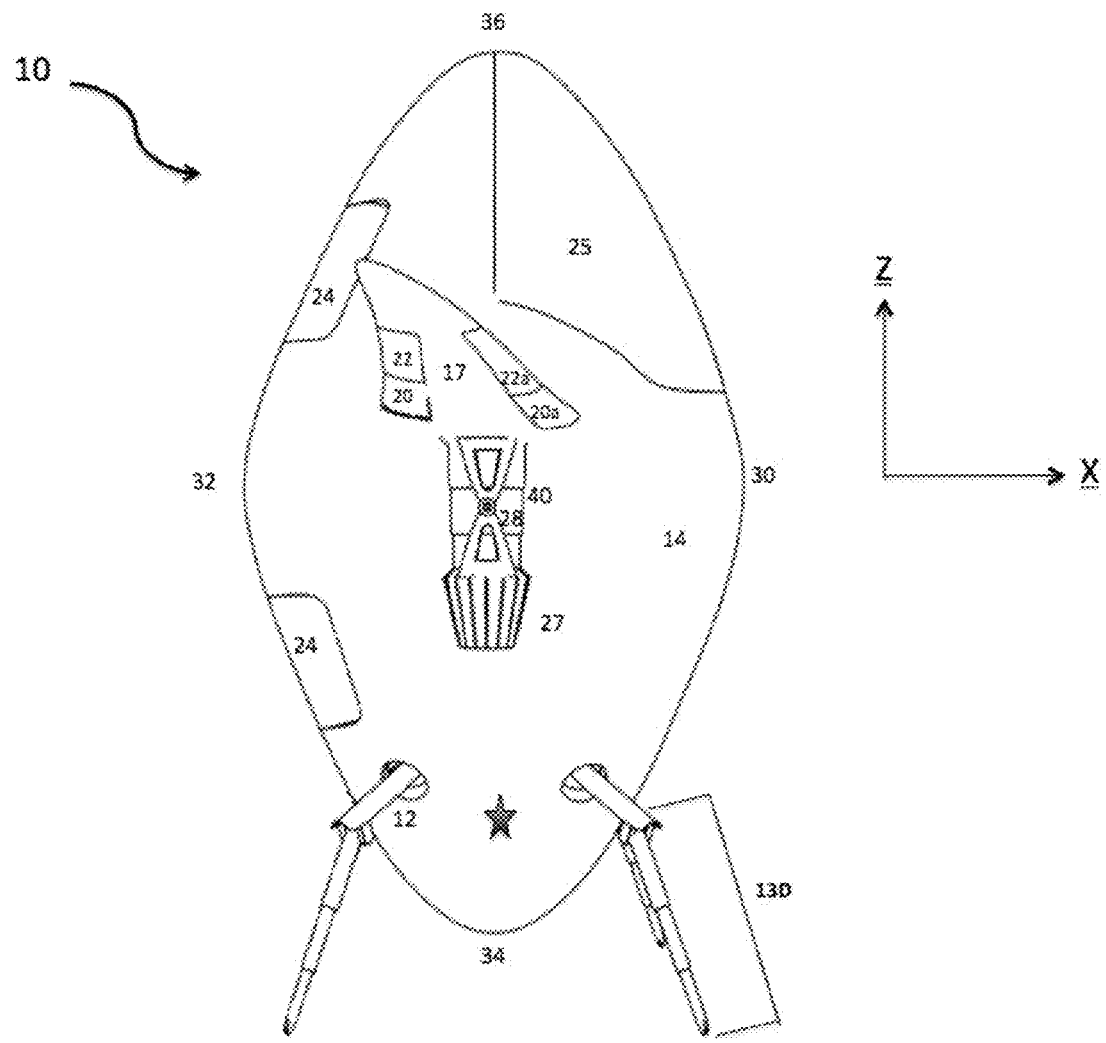
FIG. 2 is a side wire frame schematic of the UAV aircraft displaying the orientation of the fuselage, and location of rudder/yaw control surfaces

Control surfaces 20 and 22 are located on wings 17 and extend along the Y-Axis. Furthermore control surfaces 20 and 22 rotate about the Y-Axis. Control surfaces 20 and 22 control the pitch and roll of the aircraft about the X-Axis and Y-Axis in flight. Control surfaces 24 extend along the Z-Axis and control the yaw of the aircraft about the Z-Axis in flight. FIG. 2, provides an additional side view and on traditional fixed wing aircraft are denoted as the rudder on the vertical tail. Control surfaces 20a and 22a are located on wing (17) and extend along the Y-axis and rotate about the Y-axis. The control surfaces 20, 20a, 22, 22a and 24 work in synchrony in order to maintain attitude of aircraft in forward flight. The control surfaces implemented in the aircraft presented here are designed in the likeness of traditional fixed wing designed aircraft. The control surfaces 20a and 22a are typically known as slats and provide a camber or curvature to the wing in order to allow for lower flight speeds before stalling. In the aircraft presented here, these will be implemented in order to transition the aircraft from its vertical take off to forward flight transition. The control surface 20 is designated to be the pitch moment control while 22 will is designated as the roll moment control. These control surfaces are ordinarily entitled elevator and aileron respectively. Control surface 24 will control the yaw of the aircraft and is classically denoted as the rudder on a fixed wing aircraft located in the vertical stabilizer.

The arthropod landing gear assembly comprises of telescopic rods 13A, 13B, and 13C. Assembly 13D is the inclusion of 13A, 13B, 13C. Collapsing of assembly 13D is 13C into 13B, 13B into 13A. The assembly 13D rotates about hinge 13 to become flush with plate mount 12. The assembly of 13D and plate mount 12 retracts into fuselage 14. In the aircraft 10 displayed, two arthropod landing gear assemblies are placed symmetrically on both sides of aircraft 10 with respect to the X-axis. This type of landing configuration allows the desired fuselage 14 orientation, which intern provides the correct stability dynamics. In the proposed embodiment described herein, scalability would undergo further experimentation, in the event that material sciences are insufficient or an unpredicted static or dynamic equilibrium was detected. These factors therefore would be researched and optimized in accordance within the scope of the invention claimed herein.

FIG. 2 is a side view of an aircraft 10, mounted on arthropod landing assembly 13D and retractable plate 12. The aircraft 10 is configured with control surfaces 24 mounted along the rear, upper and lower portions. The location of them is placed such that they apply the correct yaw moment around the Z-axis; yet remain out of wake or turbulent mixing of air. Control surfaces 20 and 22 are positioned in rear of the wing 17. Control surfaces 20a and 22a are positioned in front of wing 17. Wing 17 is configured to fuselage 14. Cargo bay 25 is located on the upper, forward portion. Nozzle 27 is mounted below wing 17 or alongside armpit side of fuselage 14. Nozzle 27 is connected to Elbow bucket assembly 28 and is configured with rotational ring ducting assembly 40 under wing 17. In some designs vectoring flaps may replace rotational ring ducting 40. In this particular instance, configuration elbow bucket assembly 28 may not be needed. Nozzle 27 vectoring is controlled through various bar linkage extension and retractions. The side view provides appropriate view of fuselage 14 and the extension of fuselage 14 from points 32-30 along the Y-axis, and 34-36 along the Z-axis. The purpose of the vectoring the nozzle on a four-degree of freedom plane is to provide stability augmentation control to the aircraft when VTOL is utilized. In addition this must combined with an additional rotational ring bearing or other type of directional system to provide forward flight to the vehicle. A proposed variant or modification to the aircraft is to position a surveillance system between the landing gear systems and is denoted by a star in the figure.

Figure 3:
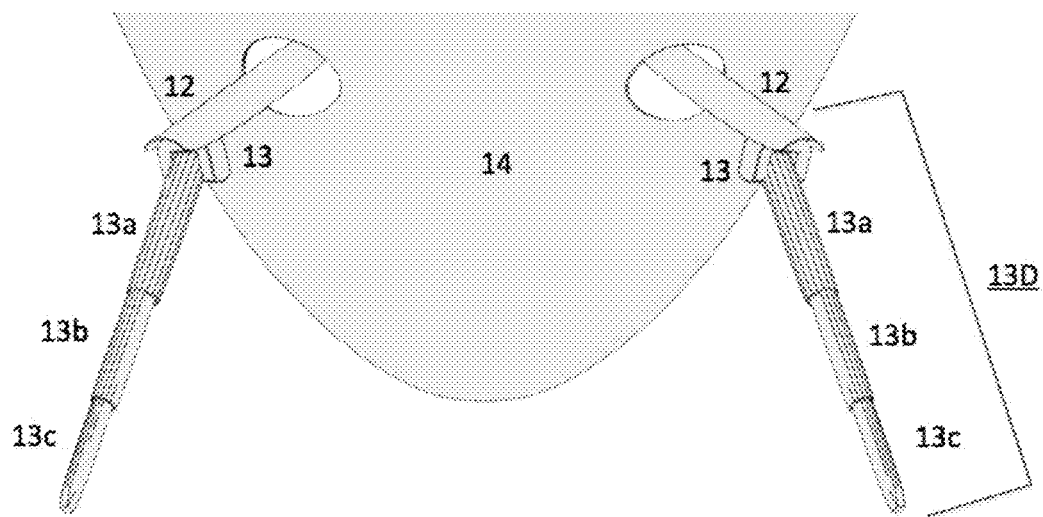
FIG. 3 is a wire frame schematic view of arthropod landing assembly.

FIG. 3 is an enhanced, zoomed schematic view of arthropod landing assembly. The arthropod landing gear assembly comprises of telescopic rods 13A, 13B, and 13C. Assembly 13D is the inclusion of 13A, 13B, 13C. Collapsing of assembly 13D is 13C into 13B, 13B into 13A. The assembly 13D rotates about hinge 13 to become flush with plate mount 12. The assembly of 13D and plate mount 12 retracts into fuselage 14. Arthropod is used in reference to an insect-legged system. Traditional aircraft employ the use of wheel, shocks, and linkage assemblies. The novelty behind implementing an arthropod type landing gear system is to prevent the wearing of tires, shocks, and the paving of runway space for traditional fixed wing take off. In addition the landing gear specified here is what allows for the uniqueness and novelty of the fuselage design.

Figure 4:
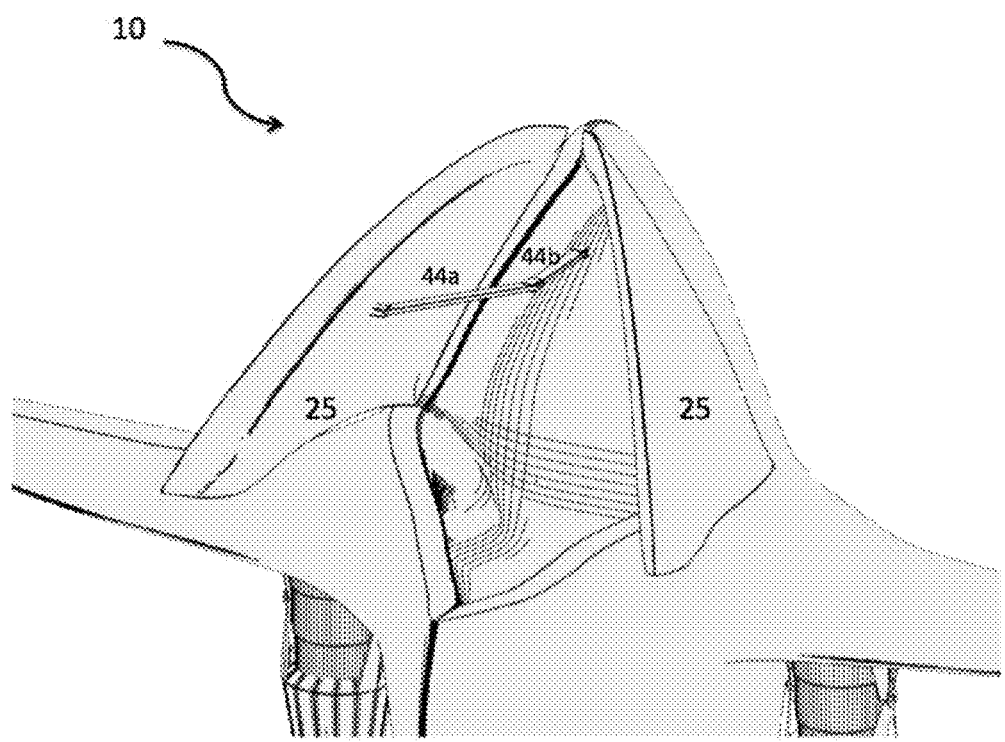
FIG. 4 is a wire frame isometric view of cargo bay assembly open.

FIG. 4 is an isometric view of cargo bay assembly open. Cargo bay doors 25 are configured with bar linkages 44a and 44b. Extension and retraction of the bar linkages 44a and 44b provide opening and closing of cargo bay doors 25. Cargo bay doors 25 close flush with fuselage 14. In some situations a pneumatic hinge actuation and series of gears may be suitable for opening cargo bay assembly. This will be determined upon inquiry request and payload designation. The cargo bay assembly may be utilized for a number of different necessities requiring transportation. These items may be related but not limited to that of small courier shipping and medical supplies.

Figure 5:
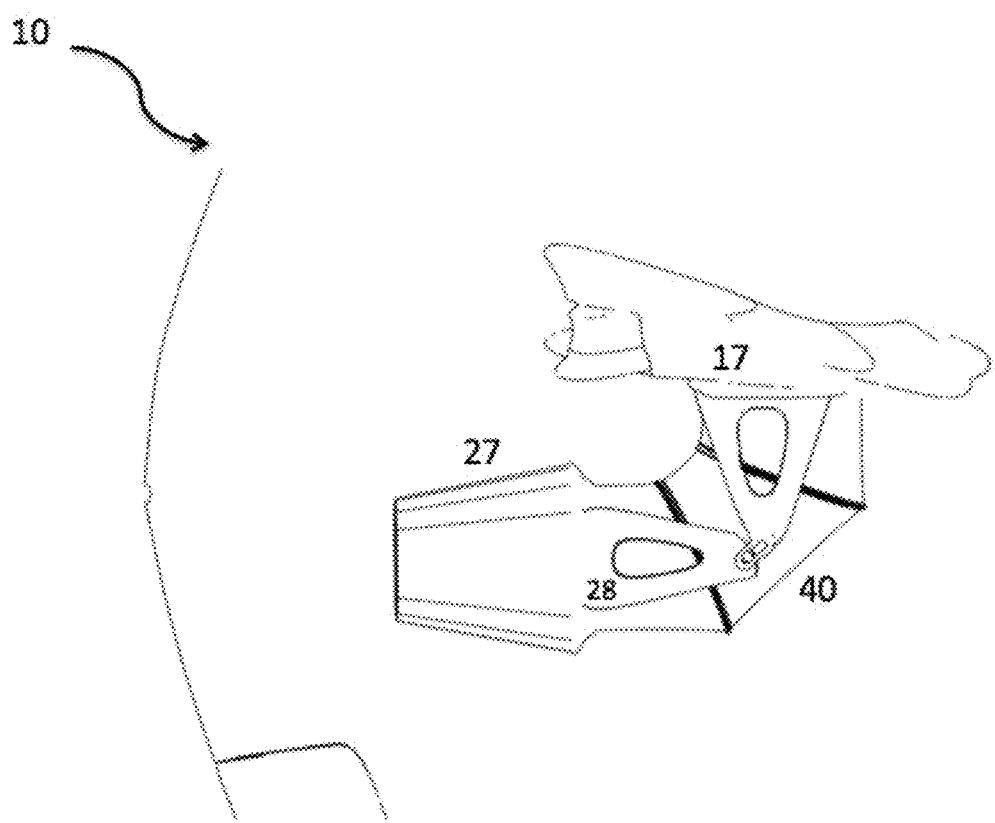
FIG. 5 is a side wire frame schematic view of engine nozzles vectored rearward.

FIG. 5 is a partial side view of an aircraft 10, mounted with nozzle 27 configured with rotational ring ducting 40. In this configuration, rotational ring-ducting assembly 40 has been retracted to view the full-vectored 90-degree configuration for forward flight. The rotational ring ducting assembly 40 is attached to elbow bucket assembly 28 and mounted under wing 17. Forward flight configuration of nozzle, ducting, and elbow assembly is directed substantially parallel to wing 17. The elbow bucket assembly 28 is to provide structural support for the rotational ring ducting assembly 40. In the dialogue mentioned above, a common reference to a rotational ring ducting assembly is a three bearing swivel module. Additionally in some thrust specific cases the elbow bucket assembly 28 may not be needed, however it is provided here in the event of. In summary, the rotational ring ducting assembly 40 provides the 90-degree rotation of the nozzle assembly 27 attaining forward flight, while the nozzle assembly 27 provides the 4 Degree of freedom actuation necessary to provide flight stability in VTOL configuration with a 0 Degree rotation of the rotational ring ducting assembly 40.

The aircraft mentioned above contains a variety of civil, commercial, and military utilizations. With the inclusion of a cargo bay, and surveillance system located onboard the aircraft, industries within shipping such as Amazon, UPS, DHL, and Fed Ex have all expressed the desire for such an aircraft to be designed. Additionally government agencies requiring data acquisition such as the National Oceanic and Atmospheric Administration have expressed requests for a multi mission UAV/Drone to collect data at an increased frequency for higher validity in their model predictions. A variant such as this would require special instrumentation deemed appropriate for such reconnaissance and to be determined at a later time. Furthermore pipeline, agriculture, news media, prison, and movie industries have all inquired about such an aircraft proposed afore. At present, the invention is preferably used in the construction of a UAV of less than 55 pounds to meet current FAA regulations, but is not limited to such a construction.

While this invention has been described with reference to exemplary embodiments, it will be understood by those skilled in the art that various changed may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

We claim:

1. An unmanned aerial vehicle ("UAV") comprising:
a symmetrically cambered fuselage having a longitudinal axis, wherein the height of the fuselage is substantially longer than the maximum width of the fuselage;
said fuselage extending from a front section to a rear section along the longitudinal axis, and having a central portion at the center of the fuselage;
a landing gear attached in the rear section of the vehicle;
said fuselage oriented perpendicular with the ground during landing and in forward flight such that the center of the fuselage is located vertically above the rear section of the fuselage; and
said fuselage having at least two fixed lifting surfaces with each lifting surface in the shape of an air foil, wherein the main lift provided by said air foils is along the longitudinal axis of the fuselage in the direction of the front section of the fuselage during forward flight.

2. The unmanned aerial vehicle (UAV) of claim 1, further comprising a control assembly including at least two independently hinged and controlled rudders alongside the rear of the aircraft wherein the rudders are placed to control the yaw of the aircraft.

3. The unmanned aerial vehicle (UAV) of claim 1, further comprising a control assembly including multiple hinged surfaces located along the trailing edge of the at least two lifting surfaces.

4. The unmanned aerial vehicle (UAV) of claim 1, further comprising a control assembly of multiple hinged surfaces located along the leading edge of the set of lifting surfaces.

5. The unmanned aerial vehicle (UAV) of claim 1, further including a propulsion vectoring assembly having two engines, each said engine having a central thrust located along the longitudinal axis of the fuselage, wherein each engine includes a nozzle located below a respective one of said at least two fixed lifting surfaces and, an elbow hinge assembly for directing the nozzle, and a rotational ring ducting assembly.

6. The UAV of claim 5, wherein said vectoring assembly is positioned alongside the fuselage and under the at least two lifting surfaces of the aircraft for VTOL configuration.

7. The propulsion vectoring assembly of claim 5, wherein the propulsion vectoring assembly rotates up to 90 degrees to cause forward flight.

8. The unmanned aerial vehicle (UAV) of claim 1, comprising an arthropod landing gear assembly further comprising of no rotational or wheel assemblies.

9. The unmanned aerial vehicle (UAV) of claim 8, wherein said arthropod landing gear has a telescopic retraction assembly comprising an upper and lower telescope leg, wherein the upper telescoping leg is hinged to the lower telescoping leg.

10. The unmanned aerial vehicle (UAV) of claim 9, wherein the lower telescoping leg retracts within the upper telescoping leg.

11. The arthropod landing gear assembly of claim 10 wherein the telescopic retraction assembly translates into the fuselage of the aircraft.

12. The arthropod landing gear assembly of claim 8, further comprises a multi-bar linkage rotational assembly.

* * * * *